(12) United States Patent
Meyer et al.

(10) Patent No.: US 6,497,160 B2
(45) Date of Patent: Dec. 24, 2002

(54) CONTROL DEVICE FOR SEMIAUTOMATIC GEARSHIFT MECHANISMS OF VEHICLES, IN PARTICULAR, MOTOR VEHICLES

(75) Inventors: Roland Meyer, Roth (DE); Thomas Claus, Ulm (DE)

(73) Assignee: Hydraulik-Ring GmbH, Nürtingen (DE)

( * ) Notice: Subject to any disclaimer, the term of this patent is extended or adjusted under 35 U.S.C. 154(b) by 2 days.

(21) Appl. No.: 09/797,416

(22) Filed: Feb. 28, 2001

(65) Prior Publication Data

US 2001/0037696 A1 Nov. 8, 2001

(30) Foreign Application Priority Data

Feb. 29, 2000 (DE) .......................... 100 09 505

(51) Int. Cl.$^7$ .............................................. F16H 59/00
(52) U.S. Cl. ....................................................... 74/335
(58) Field of Search ........................................ 741/335

(56) References Cited

U.S. PATENT DOCUMENTS 5,706,712 A * 1/1998 Tischer et al. ................ 74/335
5,749,264 A * 5/1998 Broadbent .................... 74/335

* cited by examiner

Primary Examiner—Dirk Wright
(74) Attorney, Agent, or Firm—Gudrun E. Huckett

(57) ABSTRACT

A control device for a semiautomatic gearshift mechanism of a vehicle has a first actuator for moving a gearshift shaft for gutter selection in a first shaft movement direction. A second actuator moves the gearshift shaft for gear selection in a second shaft movement direction. The first actuator has a primary piston and at least two auxiliary pistons for moving the primary piston alternatingly in two travel directions. The primary piston has a piston body having first and second piston body end faces facing away from one another. The primary piston has first and second piston rods, wherein the first piston rod is connected to the first piston body end face and the second piston rod is connected to the second piston body end face, wherein the first and second piston rods project away form the first and second piston body end faces and extend in the travel directions.

43 Claims, 9 Drawing Sheets

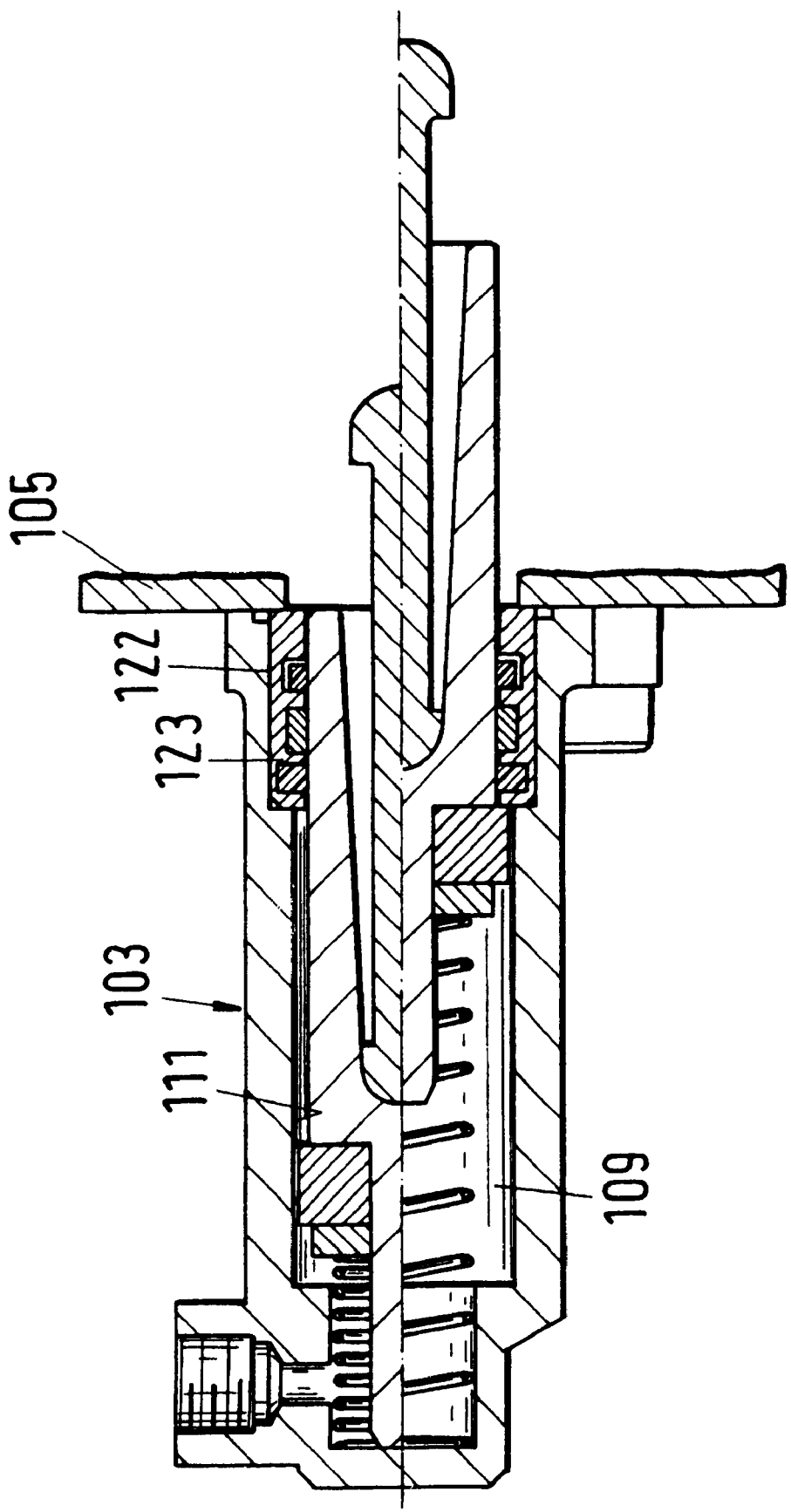

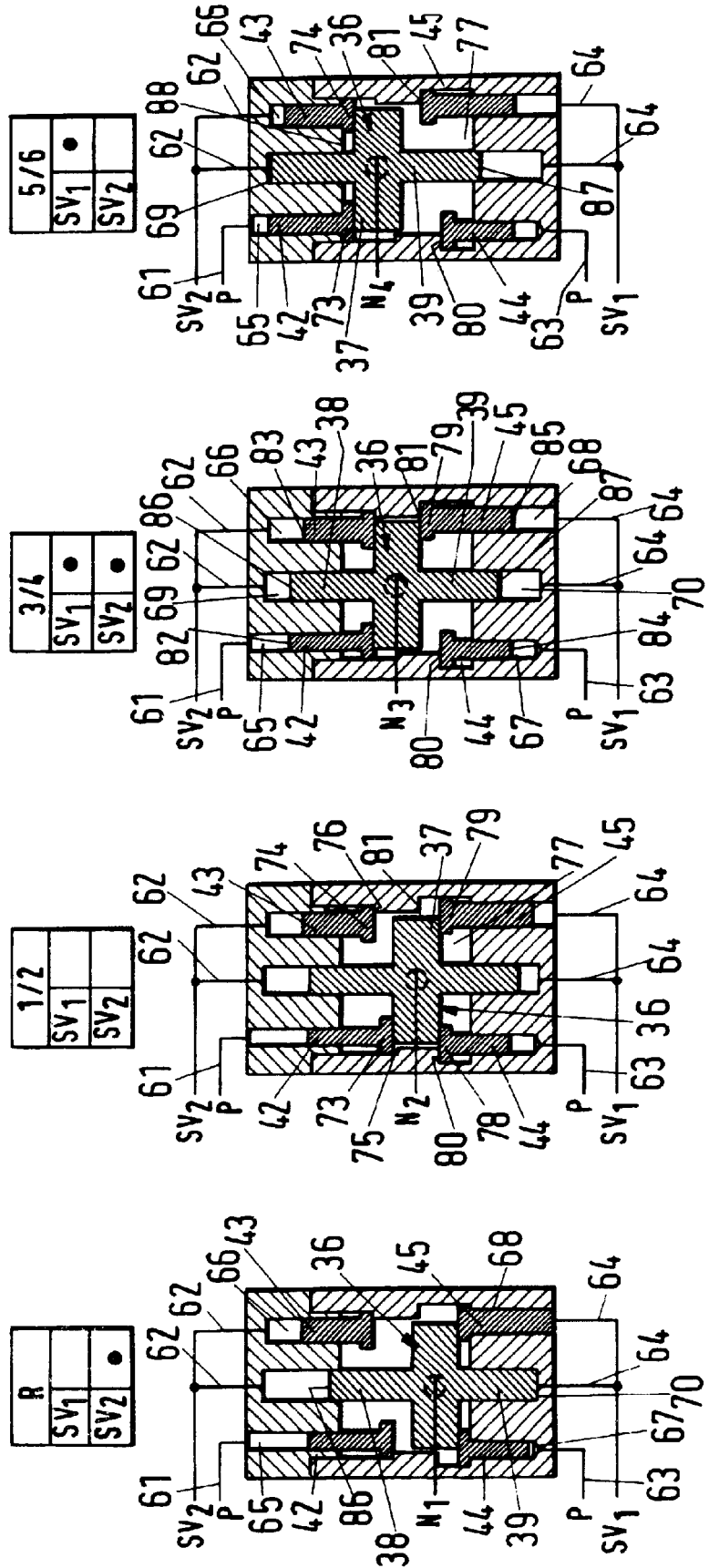

CONTROL DEVICE FOR SEMIAUTOMATIC GEARSHIFT MECHANISMS OF VEHICLES, IN PARTICULAR, MOTOR VEHICLES

BACKGROUND OF THE INVENTION

1. Field of the Invention

The invention relates to a control device for semiautomatic gearshift mechanisms of vehicles, in particular, motor vehicles, comprising two actuators with which the gearshift shaft of the gearshift mechanism is rotatable and movable (slidable) for gutter selection and gear selection.

2. Description of the Related Art

In connection with manual gearshift mechanism it is known to select the desired gutter and gears with a gearshift lever projecting into the passenger compartment. In order to provide an automatic operation of such a manual gearshift mechanism, control devices with actuators are known with which the gearshift shaft of the gearshift mechanism is rotated and moved.

SUMMARY OF THE INVENTION

It is an object of the present invention to configure the control device of the aforementioned kind such that with a compact and inexpensive configuration a problem-free and reliable gearshift action is ensured.

In accordance with the present invention, this is achieved in that the first actuator for sliding or moving the gearshift shaft has a primary piston having correlated therewith at least two auxiliary pistons with which the primary piston can be moved in two directions, as desired, and that the primary piston has two piston rods extending in the travel direction and projecting from opposite sides of a piston body of the primary piston.

In the control device according to the invention, the gearshift shaft of the gearshift mechanism is moved by means of the primary piston in cooperation with the auxiliary pistons. For this purpose, the auxiliary pistons as well as the piston rods of the primary piston are correspondingly loaded, preferably by means of a hydraulic medium. By employing two auxiliary pistons and two piston rods, the primary piston can be adjusted into a position corresponding to the respective gearshift mechanism. The actuator can be used for movement (displacement) or rotation of the gearshift shaft. It is also possible to provide both actuators with such a primary piston with piston rods and with auxiliary pistons. Then it is possible to employ the same units for both actuators of the control device according to the invention.

BRIEF DESCRIPTION OF THE DRAWING

In the drawing:

FIG. 7 shows in a representation corresponding to FIG. 5 a second embodiment of a clutch cylinder;

FIGS. 10a–10d show different positions of an actuator of the control device according to the invention for selecting the gutters of the gearshift mechanism.

DESCRIPTION OF THE PREFERRED EMBODIMENTS

Figure 1:
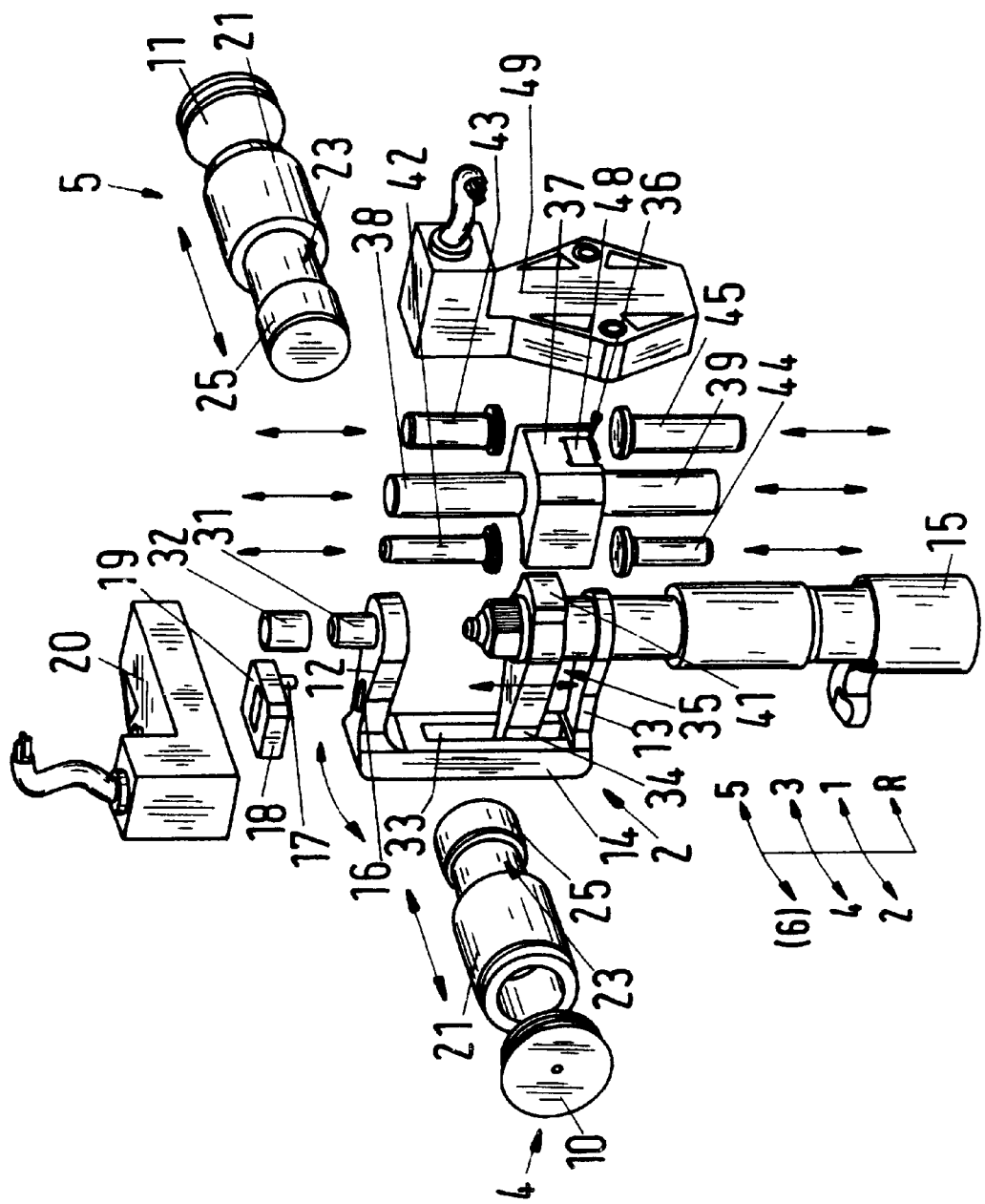
FIG. 1 is an exploded view of the control device according to the invention.

The control device according to the invention is configured for semiautomatic gearshift mechanisms of vehicles, in particular, of motor vehicles. By means of the control device the gutters of the gearshift mechanism can be selected and the corresponding gears can be shifted in the selected gutter. The control device has a housing 1 (FIG. 2), in which a positioner or gearshift lever 2 is positioned so as to be pivotable about an axis 3. On both sides of the positioner or gearshift lever 2 two piston units 4, 5 are positioned by which the gearshift lever 2 can be pivoted about the axis 3 in order to select the respective gear in a manner to be described in the following. The piston units 4, 5 are slidably supported in two cylinder chambers 6 and 7 in a sealed fashion. The cylinder chambers 6, 7 are provided in the housing 1 and are supplied with pressure medium, in particular, hydraulic oil, which is supplied via switching valves 8, 9. The switching valves 8, 9 are connected to the housing 1. The cylinder chambers 6, 7 are closed at their ends facing away from one another by a closure disc 10, 11, respectively.

As illustrated in FIG. 1, the gearshift lever 2 is U-shaped and has two parallel extending legs 12, 13 which extend perpendicularly to the pivot axis 3 and are connected to one another by a stay 14. Advantageously, the legs 12, 13 and the stay 14 are formed as a monolithic part. The lower leg 13 in FIG. 1 is seated in a rotatable fashion on the gearshift shaft 15 of the gearshift mechanism (not illustrated). When the gearshift lever 2 is pivoted by the piston units 4, 5 about the axis 3, the gearshift shaft 15, whose axis coincides with the pivot axis 3, is correspondingly pivoted by a corresponding amount as a result of the fixedly mounted intermediate member 35, and the desired gear is shifted in the selected gutter.

The upper leg 12 of the gearshift lever 2 has a slotted hole 16 arranged preferably centrally in its longitudinal direction, and a pin 17 of a solenoid support 18 engages the slotted hole 16. The solenoid support 18 receives a solenoid 19 which in connection with a sensor 20 provided in the housing 1 detects the pivot position of the gearshift lever 2. The slotted hole 16 ensures that the gearshift lever 2 and the solenoid support 18 can be moved relative to one another during pivoting.

The piston unit 4 has an outer sleeve-shaped piston 21 which is guided in a sealed fashion on the inner wall 22 of the cylinder chamber 6. The outer piston 21 is seated on an inner piston 23. The outer piston 21 is movable between the closure disc 10 and a shoulder surface 24 of the inner wall 22 of the cylinder chamber 6. The shoulder surface 24 is radially inwardly oriented. The inner piston 23 projects with a closed piston head 25 past the outer piston 21 in the direction toward the gearshift lever 2. The outer diameter of the piston head 25 is larger than the inner diameter of the outer piston 21 but smaller than its outer diameter. Moreover, the piston head 25 projects radially past the sleeve part 26 that axially guides the outer piston 21 so that at the transition from the piston head 25 to the sleeve part 26 a radially outwardly oriented annular shoulder surface 27 is formed. The gearshift lever 2 rests with its stay 14 on the piston head 25 of the inner piston 23.

The piston unit 5 is identical to the piston unit 4 but is arranged mirror-symmetrically thereto. Accordingly, the piston unit 5 has the outer piston 21 and the inner piston 23 with the sleeve part 26 and the piston head 25 projecting past the outer piston 21 in the direction toward the gearshift lever 2. The piston head 25 rests against the stay 14 of the gearshift lever 2.

The gearshift lever 2 is positioned on the piston head 25 of the inner pistons 23 of the two piston units 4, 5. The gearshift lever 2 is arranged in the receiving chamber 28 within the housing 1. Also, the solenoid support 18 and the solenoid 19 are positioned in the receiving chamber 28.

Figure 2:
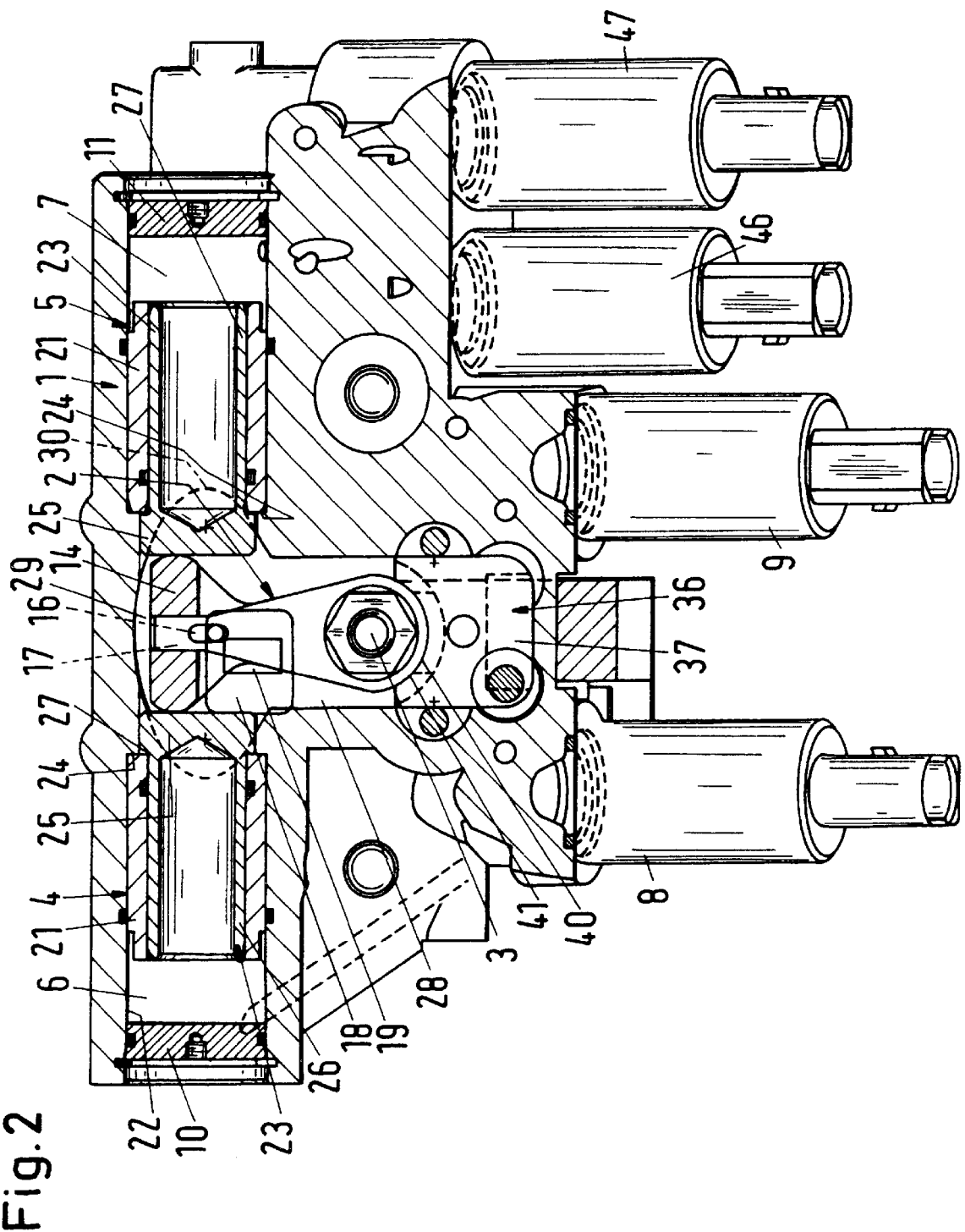
FIG. 2 is a longitudinal section view of the control device according to the invention showing a first position of the gearshift lever.

FIG. 2 shows the gearshift lever 2 in a central position in which the two piston units 4, 5 are loaded with pressure. The outer pistons 21 rest against the shoulder surfaces 24 of the housing 1 under the pressure of the pressure medium. The two inner pistons 23 rest with their piston head 25 on the stay 14 of the gearshift lever 2, also under the pressure of the pressure medium. The piston heads 25 are positioned with their mantle surface on the inner wall of a bore 29 whose diameter is smaller than the diameter of the cylinder chambers 6, 7 which are of the same size. The bore 29 is designed such that the stay 14 will not come into contact with the wall of the bore upon pivoting of the gearshift lever 2. The corresponding shape of the bore 29 is illustrated in FIG. 2 by the dashed line 30.

As illustrated in FIG. 1, a pin 31 is provided on the free end of the leg 12 of the gearshift lever 2. A bearing 32 is arranged on the pin 31. The gearshift lever 2 is supported pivotably in the housing 1 by means of the bearing 32.

The stay 14 is provided at half its width with a depression 33 which extends in the longitudinal direction of the stay 14 and is engaged by the free end 34 of the intermediate member or gearshift lever 35. It is seated on the free end of the gearshift shaft 15 which penetrates the leg 13 of the gearshift lever 2. The intermediate member or gearshift lever 35 is seated fixedly on the gearshift shaft 15 and can be moved along the depression 33 in the axial direction of the gearshift shaft 15. In doing so, the gearshift lever 35 entrains the gearshift shaft 15 in its axial direction (first shaft movement direction). In this way, the different gutters of the gearshift mechanism are selected.

In order to move the gearshift lever 35, positioned between the two legs 12, 13 of the gearshift lever 2, along the depression 33, it is fixedly connected to the primary piston 36 in the axial direction of the gearshift shaft 15. The primary piston 36 has a block-shaped piston body 37 with oppositely positioned piston body end faces having arranged thereat centrally arranged piston rods 38, 39 which are aligned with one another. In the mounted position, the piston rods 38, 39 extend parallel to the stay 14 of the gearshift lever 2. The piston body 37 is fixedly connected in the axial direction of the gearshift shaft 15 with the gearshift lever 35. Since the gearshift lever 2 provided for selecting the gears is pivotable about the axis 3 by means of the piston units 4, 5, the gearshift lever 35 engaging the depression 33 is also pivoted accordingly for the gutter selection. For this reason, the connection between the gearshift lever 35 and the primary piston 36 is configured such that the gearshift lever 35 can be pivoted relative to the primary piston 36 about the axis 3. The end face 40 of the piston body 37 (FIG. 2) facing the gearshift lever 35 is convexly curved and matched to the end face 41 of the gearshift lever 35. The primary piston 36 is actuated by four auxiliary pistons 42 to 45 which engage in pairs the end faces of the piston body 37 provided with the piston rods 38, 39. For actuating the auxiliary pistons 42 to 45, two switching valves 46, 47 are provided which are arranged on the housing 1 of the control device.

In the piston body 37 of the primary piston 36 a solenoid 48 is mounted which has correlated therewith a sensor 49. With this arrangement, the position of the primary piston 36 can be measured and evaluated. The piston body 37 of the primary piston 36 as well as the solenoid support 18 are comprised of nonmagnetic material. By means of the auxiliary pistons 42 to 45, the primary piston 36 can be moved in the axial direction of the gearshift shaft 15 in order to select the respective gutter of the gearshift mechanism. Since the primary piston 36 is connected with the gearshift lever 35, the gearshift lever 35 is moved together with the gearshift shaft 15 relative to the gearshift lever 2 upon movement of the primary piston 36.

A seal (not shown) is seated on the gearshift shaft 15 underneath the control device, preferably in the form of a rotary shaft seal which represents the only dynamically loaded seal. It is arranged in the gear mechanism housing so that leaking oil cannot reach the environment.

The gearshift lever 2 with the piston units 4, 5 and the gearshift lever 35 with the pistons 36 and 42 to 45 are arranged in the housing within a smallest possible space so that the housing is of a compact configuration.

The valves 8, 9 are connected by a line 50, 51 (FIG. 8) with the cylinder chambers 6, 7, respectively. The supply of the pressure medium from the tank 52 is realized by a pressure line 53 via which the pressure medium is supplied to lines 54, 55. The pressure medium is conveyed by means of a pump 56. The pressure line 53 has arranged therein two filters 57, 58 which retain contaminants within the pressure medium.

Figure 8:
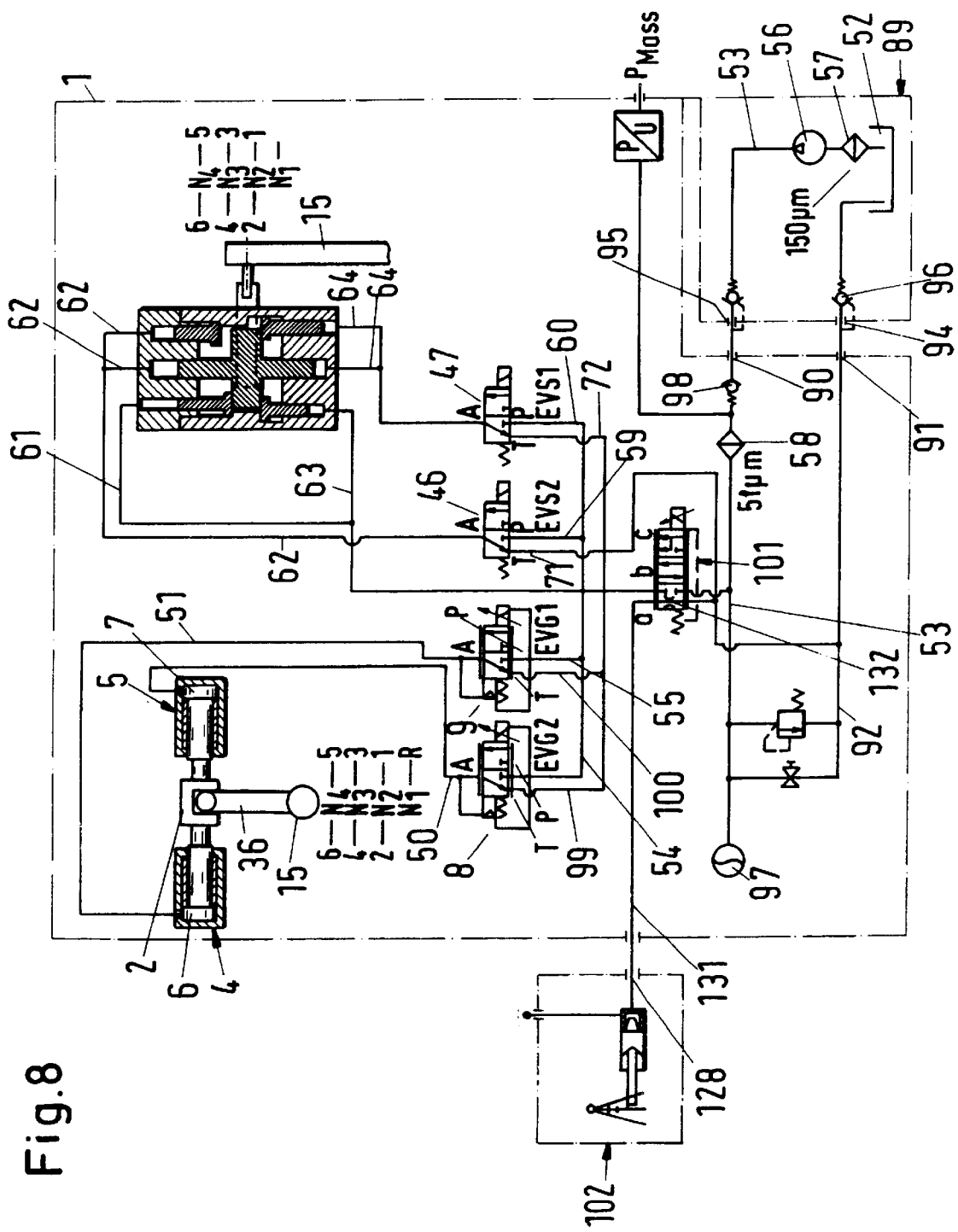
FIG. 8 is a switching diagram of the control device according to the invention.

FIG. 8 shows the gearshift lever 2 in a neutral position in which the inner pistons 23 of the piston units 4, 5 rest against the gearshift lever 2. This position of the gearshift lever 2 corresponds to the position illustrated in FIG. 2. The two inner pistons 23 rest with their piston heads 25 on the gearshift lever while the outer pistons 21 rest under the force of the pressure medium on the shoulder surfaces 24 of the housing 1. In order to load the piston units 4, 5 with pressure, the two valves 8, 9 are switched from the position illustrated in FIG. 8 such that the pressure medium flows via the lines 50, 51 into the cylinder chambers 6, 7. In this position of the gearshift lever 2, the neutral position $N_1$ to $N_4$ of the gearshift mechanism is reached in each gutter. In FIG. 8, the switching diagram of the gearshift mechanism is illustrated which has six forward drive gears and one reverse gear R.

In order to select the respective gutter, the primary piston 36 is loaded with pressure medium by means of the auxiliary pistons 42 to 45 via the two valves 46, 47. The switching valves 46, 47 are connected via the lines 59, 60 to the pressure line 53. The connection of the valves 46, 47 to the pistons 36, 42 to 45 is realized by lines 61, 62 and 63, 64. The arrangement and control of the pistons 36 and 42 to 45 will be explained in more detail with the aid of FIG. 10. The auxiliary pistons 42 to 45 are mounted in the pressure chamber 65 to 68 of the housing 1. The piston rods 38, 39 of the primary piston 36 are positioned in the pressure chambers 69 and 70. The lines 61 and 62 open into the pressure chambers 65, 66. The lines 63 and 64 open into the pressure chambers 67 and 68. The piston rods 38, 39 of the primary piston 36 are positioned between two auxiliary pistons 42, 43 and 44, 45, respectively. A line 62, 64 opens into the pressure chambers 69, 70 of the piston rods 38, 39, respectively.

During gearshifting, first one of the gutters $N_1$ to $N_4$ is selected in which the gear to be shifted is positioned. For this purpose, the gearshift shaft 15 must be moved in its axial direction for which purpose the primary piston 36 must be moved relative to the gearshift lever 2. Since the primary piston 36 is fixedly connected in the axial direction of the gearshift shaft 15 with the gearshift lever 35, the gearshift lever 35 is moved with its free end 34 along the depression 33 in the stay 14 of the gearshift lever 2. Instead of the depression 33 the stay 14 of the gearshift lever 2 can also be provided with a corresponding penetration. The gearshift lever 2 is at rest during the movement of the primary piston 36.

In order to move the gearshift shaft 15 to the neutral position $N_2$ (FIG. 10b), the two switching valves 46, 47 are supplied with electric current. The corresponding switching position of the valves 46, 47 is illustrated in FIG. 8. Communication between the lines 59, 62 and the lines 62, 64 is interrupted. The lines 61 to 63 are under pressure because a clutch control valve 101 is in its closed position a. The two auxiliary pistons 42, 43 rest with their widened piston heads 73, 74 provided at their end faces on shoulder surfaces 75, 76 which are provided on the inner wall of the receiving chamber 77 which receives the piston body 37 of the primary piston 36. The shoulder surface 75 is staggered relative to the shoulder surface 76 in the travel direction of the auxiliary pistons 42, 43. The auxiliary pistons 44, 45 rest with their disc-shaped piston heads 78, 79 provided at their end faces on the piston body 37 of the primary piston 36. The auxiliary piston 44 rests also on the shoulder surface 80 in the receiving chamber 77. The auxiliary piston 45 has also correlated therewith a shoulder surface 81 which is provided on the inner wall of the receiving chamber 77. This shoulder surface 81 is staggered relative to the shoulder surface 80 in the travel direction of the auxiliary piston. The spacing measured in the travel direction between the shoulder surfaces 80, 81 as well as 75, 76 is smaller than the thickness of the piston body 37 of the primary piston 36. Accordingly, the auxiliary piston 45 has a spacing from the shoulder surface 81 while the auxiliary piston 44 with its piston head 73 rests on the shoulder surface 80 as well as on the underside of the piston body 37 of the primary piston 36.

The piston heads 73, 74; 78, 79 have the same piston surface area, respectively. The shoulder surfaces 80, 81 have a surface area that is larger than that of the shoulder surfaces 75,76 positioned oppositely, respectively, in the travel direction of the auxiliary pistons. Accordingly, the auxiliary pistons 42, 44 and 43, 45, positioned opposite one another in the travel direction, are staggered relative to one another in the axial direction. The auxiliary pistons 42, 43 correlated with the smaller shoulder surfaces 75, 76 project therefore with a larger surface area of their piston heads 73, 74 into the receiving chamber 77 than the oppositely positioned auxiliary pistons 44, 45 whose piston heads 78, 79 are covered by the larger shoulder surfaces 80, 81 by a greater amount when in the contact position.

When the gearshift shaft 15 is in its neutral position in which the switching valves 46, 47 are not supplied with electric current (FIGS. 8 and 10b), the gearshift lever 2 can be pivoted about the axis 3 by loading the piston units 4, 5 in the desired direction in order to select the first or second gear in the gutter $N_2$. In the illustration according to FIG. 8 the gearshift lever 2 is pivoted in the gutter $N_2$ in the clockwise direction for selecting the first gear and is pivoted counterclockwise for selecting the second gear.

When it is desired to select the gutter $N_3$ in which the third and fourth gears are positioned, the two switching valves 46, 47 are supplied with electric current. Via the lines 62 the pressure medium can flow into the pressure chambers 66, 69, 68, 70 (FIG. 10c). The auxiliary pistons 42, 44 remain under pressure via the lines 61, 63. The end faces of the auxiliary pistons 42 to 45 and of the piston rods 38, 39 facing the pressure medium are differently sized. The end faces 82, 84 of the auxiliary pistons 42, 44 have the smallest surface area. The end faces 86, 87 of the piston rods 38, 39 of the primary piston 36 have the largest surface area while the end faces 83, 85 of the auxiliary pistons 43, 45 have an intermediate surface area. Since based on the position according to FIG. 10b the auxiliary piston 43 is spaced from the piston body 37 of the primary piston 36 and rests against the shoulder surface 76, the primary piston 36 is moved by loading the end faces 85, 87 of the auxiliary piston 45 and of the piston rod 39 upwardly because the total surface area of the loaded end faces 85, 87 is greater than that of the loaded end faces 82 and 86 of the auxiliary piston 42 and of the piston rod 38. As a result of its movement, the primary piston 36 lifts off the auxiliary piston 44 which rests under the pressure of the pressure medium against the shoulder surface 80. As soon as the auxiliary piston 45 with its piston head 77 comes into contact with the shoulder surface 81, the primary piston 36 stops. Now the third or fourth gear can be selected by pivoting the gearshift lever 2 in one or the other direction.

In order to move the gearshift shaft 15 from the neutral position $N_3$ into the neutral position $N_4$ (FIG. 10d), the valve 46 is no longer supplied with electric current so that only the valve 47 is supplied with electric current. Accordingly, the piston rod 39 of the primary piston 36 and the auxiliary piston 45 are loaded with pressure medium. The auxiliary piston 44 is still under system pressure and rests against the shoulder surface 80. Also, the auxiliary piston 45 rests against the shoulder surface 81 under the pressure of the pressure medium. The primary piston 36 is thus moved, as a result of loading of the end face 87 of its piston rod 39, and entrains the auxiliary pistons 42, 43. The pressure medium in the pressure chambers 65, 66, 69 is displaced into the tank. As soon as the piston heads 73, 74 of the auxiliary pistons 42, 43 come to rest against the wall 88 delimiting the receiving chamber 77, the neutral position $N_4$ has been reached. The primary piston 36 entrains via the gearshift lever 35 the gearshift shaft 15. In the neutral position $N_4$ the gearshift lever 2 can be pivoted in the corresponding direction about the axis 3 in order to select the fifth or sixth gear.

In order to move the gearshift shaft 15 from the neutral position $N_4$ back into the neutral position $N_3$, the two switching valves 46, 47 are again supplied with electric current. They are thus switched such that the pressure medium flows under pressure via the lines 62, 64 into the pressure chambers 69, 66 as well as 68, 70. Accordingly, the end faces 82, 83, and 86 of the auxiliary pistons 42, 43 and of the piston rod 38 are pressure-loaded. Since the piston body 37 of the primary piston 36 is spaced from the two auxiliary pistons 44, 45 in the neutral position $N_4$, only the pressure which acts on the end face 87 of the piston rod 39 of the primary piston 36 acts against it. This has the result that the primary piston 36 is moved back into the position according to FIG. 10c. This results in a force balance because the auxiliary piston 43 comes to rest against the shoulder 76 and the oppositely positioned auxiliary piston 45 comes to rest against the shoulder surface 81.

In order to return the gearshift shaft 15 from the neutral position $N_3$ into the neutral position $N_2$, the electric current supply of the two switching valves 46, 47 is switched off. Now only the auxiliary pistons 42, 44 are acted upon by the pressure medium. Since in the neutral position $N_3$ the piston body 37 of the primary piston 36 has still a spacing from the auxiliary piston 42, it is moved downwardly by the auxiliary piston 42 to such an extent that it comes to rests against the shoulder surface 75. When doing so, it entrains the auxiliary piston 45 so that it is lifted off the shoulder surface 81.

From the position $N_2$ the gearshift shaft 15 can finally be moved into the position $N_1$. For this purpose, the switching valve 47 is supplied with electric current so that via the lines 62 the pressure medium will load the auxiliary piston 43 and the piston rod 38 of the primary piston 36. Since the auxiliary piston 43 rests against the shoulder surface 76, the pressure loading of the auxiliary piston 43 has no effect on the primary piston 36. Accordingly, it is moved in the downward direction as a result of loading of the end face 86 of the piston rod 38 and entrains the auxiliary pistons 44, 45. The position $N_1$ is reached when the piston rod 39 comes to rest against the bottom of the pressure chamber 70 and the piston heads 78, 79 of the auxiliary pistons 44, 45 come to rest at the wall of the receiving chamber. It is now possible to select in this gutter the reverse gear R by a corresponding pivoting action of the gearshift lever 2. Upon movement of the auxiliary pistons 44, 45 as well as of the piston rod 39 of the primary piston 36, the pressure medium of the pressure chambers 67, 68, 70 is displaced toward the tank 52.

The tank 52 with the pump 56 is arranged in an auxiliary unit 89 (FIG. 8) which can be connected to the housing 1 of the control device. The housing 1 for this purpose has corresponding line connectors 90, 91 into which the pressure line 53 as well as a return line 92 open. The auxiliary unit 89 has two counter connectors 93, 94 which are secured by closure members or check valves 95, 96. They prevent that the pressure medium contained in the tank 52 can leak out of the auxiliary unit 89 when it is not connected to the housing 1. As soon as the auxiliary unit 89 is connected with its counter connectors 93, 94 to the line connectors 90, 91 of the housing 1, the return or check valves 95, 96 are forcibly opened during this insertion process so that the pressure line as well as the return line in the auxiliary unit 89 are now in communication with the pressure line 53 and the return line 92 of the housing 1.

The pressure line 53 is provided with a storage 97 for the pressure medium which storage is located in the housing 1. The storage 97 is secured by a check valve 98 so that the pressure medium contained in the storage 97 cannot leak via the line connector 90 to the exterior when the auxiliary unit 89 is not connected. The arrangement of the storage 97 in the housing 1 imparts also emergency running properties to the control device. Should a line breakage occur, the pressure medium contained in the storage 97 can still be used to carry out a few shifting operations with the gearshift mechanism.

Figure 9:
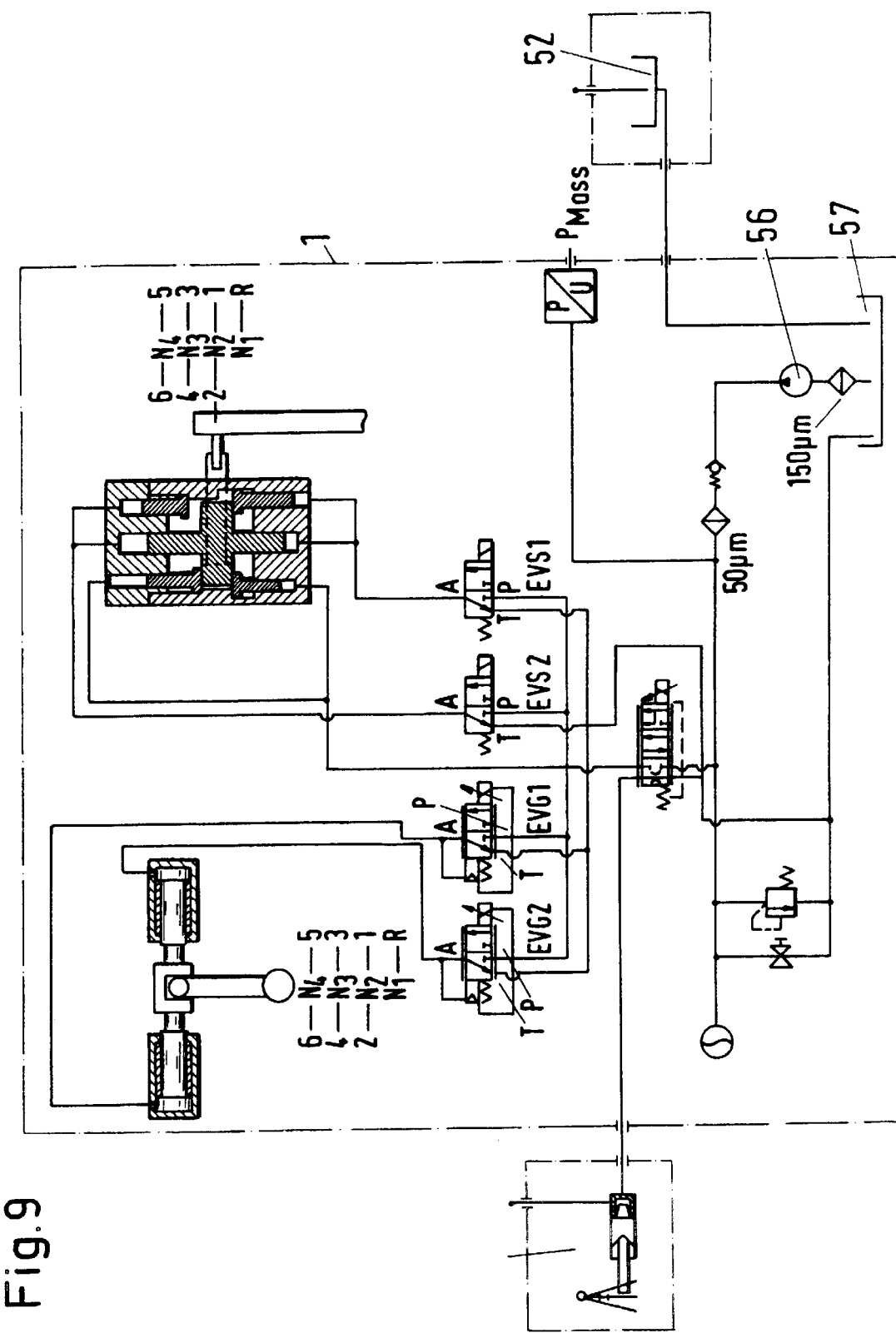
FIG. 9 is an illustration corresponding to FIG. 8 showing a further embodiment of a control device according to the invention.

FIG. 9 shows the possibility of integrating the tank 52 with the pump 56 in the housing 1 of the control device. This has the advantage that no pressure lines are present which extend to the exterior so that leakage of the pressure medium from the housing 1 is reliably prevented in the case of a line breakage.

In FIG. 9 the dashed lines indicate that the tank 52 can be arranged also external to the housing 1. In this case, it is suitably connected as an auxiliary unit with the housing 1.

In order to be able to pivot the lever 2 in the respectively selected gutter of the gearshift mechanism for selecting the desired gear, the two piston units 4, 5 are loaded via the switching valves 8, 9 in a corresponding way.

FIG. 2 shows the pivot lever 2 in its central position. The two inner pistons 23 rests with their piston heads 25 against the pivot lever 2. The outer pistons 21 have been moved under the force of the pressure medium against the stop 24 at the housing. The outer pistons 21 project radially inwardly past the stop 24. The two switching valves 8, 9 are supplied with electric current so that the pressure medium can flow via the pressure lines 50, 51 into the pressure chambers 6, 7.

Figure 3:
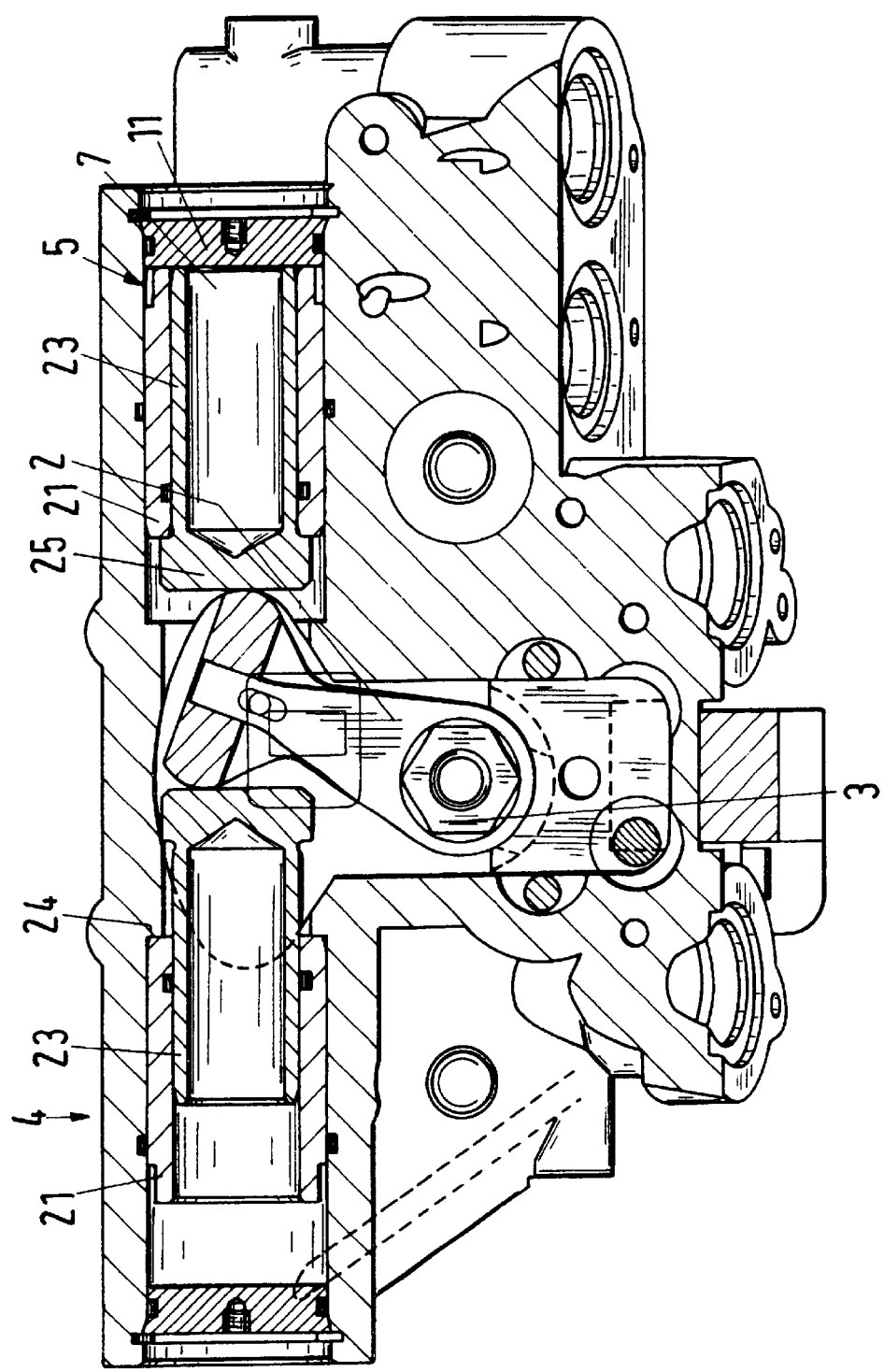
FIG. 3 shows in a representation according to FIG. 2 a further position of the gearshift lever of the control device when selecting the gears R-1-3-5 of the semiautomatic gearshift mechanism.

In order to be able to select for a selected gutter the reverse gear R as well as the first, third, or fifth gear of the gearshift mechanism, the gearshift lever 2 is pivoted about the axis 3 into the position illustrated in FIG. 3. This is achieved in that the switching valve 8 is no longer supplied with electric current. This has the result that the inner piston 23 of the piston unit 4 is moved past the outer piston 21 in the direction toward the piston unit 5. The outer piston 21 of the piston unit 4 is supported on the shoulder surface 24 provided on the housing so that it cannot be moved any father despite pressure loading. Since the switching valve 8 is no longer supplied with electric current, the pressure medium contained in the pressure chamber 7 can flow via the line 50 and a tank line 99 (FIG. 8) back to the tank 52. The inner piston 23 of the piston unit 4 pivots the gearshift lever 2 in the illustration according to FIG. 3 in a clockwise direction so that the inner piston 23 of the piston unit 5 is moved back by means of the piston head 25. Since is projects at the end face past the outer piston 21, the inner piston 23 engages the outer piston 21 until the two pistons 21, 23 will come to rest against the closure disc 11.

Figure 4:
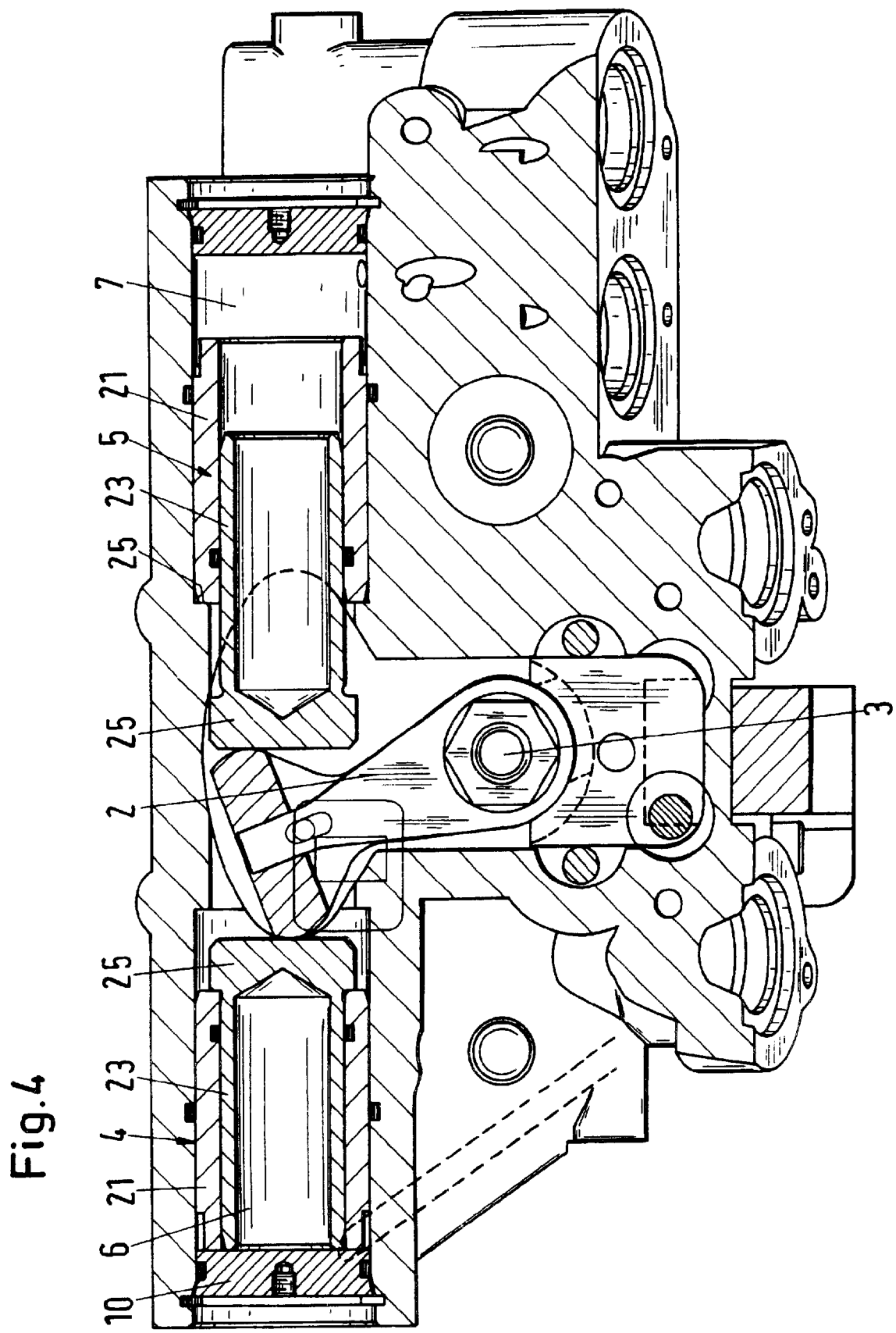
FIG. 4 shows in a representation according to FIG. 2 yet another position of the gearshift lever of the control device when selecting the gears 2–4 of the semiautomatic gearshift mechanism.

FIG. 4 shows the position of the gearshift lever 2 in order to select in the respectively selected gutter the second, fourth, or sixth gear. In this case, the switching valve 8 is supplied with electric current so that the pressure medium flows via the line 50 into the pressure chamber 7. The other switching valve 9 remains without electric current supply so that the pressure chamber 6 is connected via the line 51 and the tank line 100 with the tank 52. Accordingly, by pressure loading of the piston unit 5 the inner piston 23 is moved out so that its piston head 25 pivots the lever 2 about the axis 3 in a counter-clockwise direction. The outer piston 21 of the piston unit 5 rests against the shoulder surface 25 of the housing. During the pivot movement, the gearshift lever 2 moves by means of the piston head 25 the inner piston 23 of the piston unit 4. The piston head 5 entrains the outer piston 21 until both pistons 21, 23 come to rests against the closure disc 10.

When the gearshift mechanism has only five gears, only the second or fourth gear is selected in the selected gutter by means of the gearshift lever 2 in the position according to FIG. 4.

In order to perform the respective shifting action, first the switching valves 46, 47 are actuated in the described way in order to select, by longitudinal movement of the gearshift shaft 15, the respective gutter of the gearshift mechanism. Subsequently, the two switching valves 8, 9 are actuated in order to select in the selected gutter the desired gear. When the lever 2 carries out the pivot movement, the gearshift shaft 15 is rotated about its axis (second shaft movement direction) by means of the gearshift lever 35 which is fixedly connected thereto by a positive-locking connection in the rotational direction. In doing so, the gearshift lever 35 is pivoted relative to the primary piston 36 without releasing the positive-locking connection, active in the axial direction, between the gearshift lever 35 and the primary piston 36.

Since the gearshift lever 2 and the primary piston 36 are each provided with a solenoid 19 and 48, respectively, the magnetic field emitted by these solenoids can be detected by the respective sensor 20 or 49 so that it is possible to determine reliably which gutter of the gearshift mechanism has been selected and which gear has been shifted.

Figure 5:
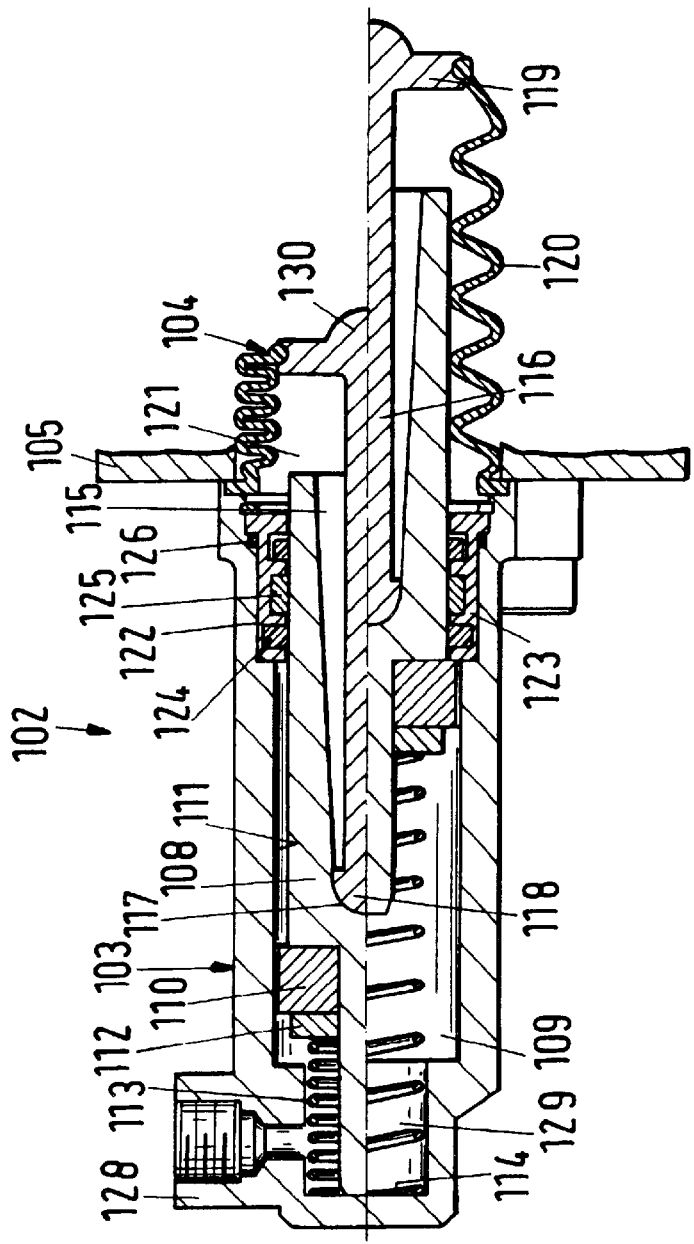
FIG. 5 is a section view of a clutch cylinder.

The control device has a further special feature in that a clutch control valve 101 is positioned in the pressure line 53 (FIG. 8). With it a clutch 102 can be actuated as a function of the shifting movements. As illustrated in FIG. 5, the clutch 102 has a cylinder 103 in which an actuating element in the form of a piston 104 is slidingly supported. A cylinder housing 103 in the illustrated embodiment is connected to the gear housing 105. It is also possible to fasten the cylinder housing 103 to a separate holder. The cylinder housing 103 has advantageously a circular cross-section (FIG. 6) and projects perpendicularly from a wall of the gear housing 105. Two transversely projecting brackets 106, 107 are provided on the cylinder housing 103 (FIG. 6) and are screwed onto the sidewall of the gear housing 105. The cylinder housing 103 can be formed as a cast part and can be comprised of light metal, advantageously aluminum, or of plastic material.

The piston 104 has an outer part 108 which is non-magnetizable and which is arranged in a receptacle 109 of the cylinder housing 103. On an end portion of the piston part 108, which has a reduced diameter, an annular solenoid 110 is provided as well as a disc 112 which is non-magnetizable. One end of a coil spring 113 is supported on the disc 112 and surrounds the end portion of the piston part 108. The other end of the spring 113 rests against the bottom 114 of the receptacle 109. The magnetic field emitted by the annular solenoid 110 can be detected by a sensor on the housing (not illustrated in the Figures) so that it can be determined reliably in which control range (engaged or disengaged) the clutch 102 is positioned.

The piston part 108 has a conical depression 115 in which an inner piston part 116 is arranged. The depression 115 has a part-spherical bottom 117 on which the inner piston part 116 rests with its part-spherical end piece 118. The inner piston part 116 projects axially past the outer piston part 108 and has near its free end a radially outwardly oriented annular flange 119 on which one end of a bellows 120 is fastened. The other end of the bellows 120 is fastened on the end face of the gear housing 105. The bellows 120 serves only as a dust seal and surrounds the piston 104 within a receiving chamber 121 of the gear housing 105.

The cylinder housing 103 has adjacent to the gear housing 105 at the inner wall 111 a depression 122 in which a bushing 123 is positioned. Inside the bushing 123, an annular seal 124, a guide strip 125, and an annular stripper 126 are arranged successively and with axial spacing. By means of the annular seal 124 the piston 104 is sealed. In any axial position the annular seal 124 is positioned in a seal-tight fashion on the piston part 108. The annular guide strip 125 which has a rectangular cross-section is positioned also on the piston part 108 and receives transverse forces. The stripper 126 which is arranged adjacent to the gear housing 105 prevents that dirt particles can enter the housing 103 during the stroke movements of the piston 104. The bushing 123 is secured axially in the depression 122 by a securing ring 127 and thus provides the guide part for the entire piston 104. An expensive mechanical inner machining of the inner wall 111 is no longer required as a result of this configuration.

On the free end of the cylinder housing 103 a radially extending connector 128 is provided via which pressure medium can be supplied in order to move the piston 104 for actuation of the clutch 102 in a manner to be described in the following. The connector 128 opens into a pressure chamber 129 which at one end is delimited by the bottom 114 of the housing 103 and on the other end by the annular solenoid 110.

The upper half of FIG. 5 shows the position of the piston 104 when the clutch 102 is closed. The pressure plate (not shown) of the clutch 102 presses onto a part-spherical projection 130 on the free end of the inner piston part 116 and moves thus the piston 104 against the force of the coil pressure spring 113 into the cylinder housing 103. The spring force of the pressure plate of the clutch 102 is significantly greater than the counter force acting on the piston 104 by the pressure spring 113. When the clutch 102 is to be actuated for shifting gears, the pressure medium is supplied via the connector 128 into the pressure chamber 129 and the piston 104 is correspondingly pressure-loaded. The force exerted by the pressure medium in connection with the spring force 113 is sufficient to overcome the spring force of the pressure plate so that the clutch is disengaged and the gearshift action can be performed.

The pressure spring 113 serves for pressing of the disc 112 onto the annular solenoid 110. Moreover, the pressure spring 113 ensures that the piston 104 with the projection 130 rests at all times on the pressure plate of the clutch 102. To the right of the disc 112 an annular solenoid disc 110 is advantageously provided whose magnetic field is detected by a sensor (not illustrated). The position of the piston 104 can thus be determined reliably. The piston 104, in particular, its outer piston part 108 can be machined centerless. Since the depression 115 widens conically in the direction toward the free end of the piston part 108 and the inner piston part 116 rests via the part-spherical end member 18 on the part-spherical bottom 117 of the depression 115, the inner clutch part 116 can be pivoted slightly, without the function of the valve piston 104 being impaired.

Figure 6:
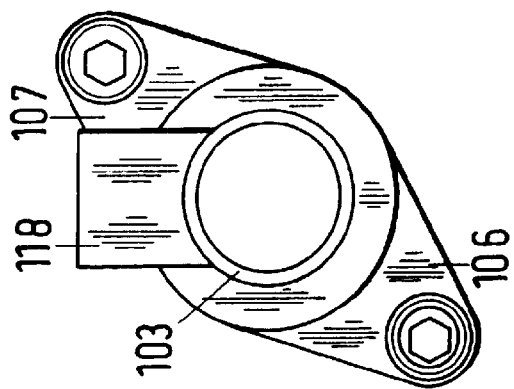
FIG. 6 is an end view of the clutch cylinder according to FIG. 5.

FIG. 7 shows the cylinder housing 103 which is substantially of the same configuration as the embodiment according to FIGS. 5 and 6. Only the bellows 120 forming a dust seal is eliminated. The bushing 123 positioned in the depression 122 of the inner wall 111 of the cylinder housing 103 rests with one of its end faces on the end face of the gear housing 105. Accordingly, the securing ring 27 according to the previous embodiments is obsolete. Otherwise, this embodiment is identical to that of the previous embodiment.

The clutch 102 is actuated by means of the clutch control valve 101 (FIG. 8). It has three switching positions a, b, and c. The connector 128 of the cylinder housing 103 of the clutch 102 is connected by means of a pressure line 131 with the clutch control valve 101.

In the switching position a (solenoid not supplied with electric current), which is illustrated in FIG. 8, the pressure chamber 129 is connected by a throttle 132 with the return line 92. The clutch 102 is locked so that in the case of power fluctuations (voltage/current) the clutch cannot unexpectedly engage and result in a sudden propelling movement of the vehicle. Moreover, all switching processes are performed in the control device (control device is not pressure-loaded).

When the clutch control valve 101 is switched into the switching position b, the pressure line 131 is connected with the return line 92 extending to the tank so that the piston 104 can be moved back by the pressure plate of the clutch 102 and the clutch can thus be closed (engaged). The pressure medium which is present in the pressure chamber 129 of the cylinder housing 103 is then displaced via the line 131 to the tank 52. At the same time, the connection of the pressure line 53 via the clutch control valve 101 to the pressure lines 61, 63 is also opened in the switching position b, as in the switching position c, so that the pressure medium which is under pressure can act in the corresponding pressure chambers 65 to 70 of the pistons 42 to 45 and 38, 39 (FIG. 10). The control device thus secures the gear shifted in the switching position c during the closing (engaging) action of the clutch.

In the switching position c (solenoid supplied with electric current), the clutch 102 and the control device are released. Accordingly, during the clutch opening (disengaging) process the gear or the gutter is selected in the control device in the manner described above.

While specific embodiments of the invention have been shown and described in detail to illustrate the inventive principles, it will be understood that the invention may be embodied otherwise without departing from such principles.

What is claimed is:

1. A control device for a semiautomatic gearshift mechanism of a vehicle, said control device comprising:
    a first actuator configured to move a gearshift shaft for gutter selection in a first shaft movement direction;
    a second actuator configured to move the gearshift shaft for gear selection in a second shaft movement direction;
    wherein said first actuator comprises a primary piston (36) and at least two auxiliary pistons (42–45) configured to move said primary piston (36) alternatingly in two travel directions;
    wherein said primary piston (36) has a piston body (37) having first and second piston body end faces facing away from one another;
    wherein said primary piston (36) comprises first and second piston rods (38, 39), wherein said first piston rod (38) is connected to said first piston body end face and said second piston rod (39) is connected to said second piston body end face, wherein said first and second piston rods (38, 39) project away form said first and second piston body end faces and extend in said travel directions; and
    wherein said first piston rod (38) has a first piston rod end face (86), said second piston rod (39) has a second piston rod end face (87), each of said auxiliary pistons (42–45) has a piston end face (82–85), wherein said first and second piston rod end face (86, 87) and said piston end faces (82–85) are configured to be loaded by a pressure medium, and wherein said first and second piston rod end faces (86, 87) have a size that differs from a size of said piston end faces (82–85).

2. The control device according to claim 1, wherein said piston body (37) is block-shaped.

3. The control device according to claim 1, wherein said first piston body end face interacts with a first and second one of said auxiliary pistons (42, 43) and wherein said second piston body end face interacts with a third and fourth one of said auxiliary pistons (44, 45).

4. The control device according to claim 3, wherein said first and second auxiliary pistons (42, 43) are positioned on opposite sides of said first piston rod (38) and wherein said third and fourth auxiliary pistons (44, 45) are positioned on opposite sides of said second piston rod (39).

5. The control device according to claim 3, wherein the size of said piston end faces (82–83) of said first and second auxiliary pistons (42, 43) is smaller than the size of said first piston rod end face (86) and wherein the size of said piston end faces (84–85) of said third and fourth auxiliary pistons (44, 45) is smaller than the size of said second piston rod end face (87).

6. The control device according to claim 3, wherein the size of said piston end face (82) of said first auxiliary piston (42) differs form the size of said piston end face (83) of said second auxiliary piston (43), and wherein the size of said piston end face (84) of said third auxiliary piston (44) differs from the size of said piston end face (85) of said fourth auxiliary piston (45).

7. The control device according to claim 6, wherein said piston end faces (82, 84) of said first and third auxiliary pistons (42, 44) are smaller than said piston end faces (83, 85) of said second and fourth auxiliary pistons (43, 45), respectively, and wherein said first and third auxiliary pistons (42, 44) have a travel path that is larger than a travel path of said second and fourth auxiliary pistons (43, 45).

8. The control device according to claim 7, further comprising stops (75, 76, 80, 81) positioned in said travel paths of said auxiliary pistons (42–45), respectively.

9. The control device for a semiautomatic gearshift mechanism of a vehicle, said control device comprising:
    a first actuator configured to move a gearshift shaft for gutter selection in a first shaft movement direction;
    a second actuator configured to move the gearshift shaft for gear selection in a second shaft movement direction;
    wherein said first actuator comprises a primary piston (36) and at least two auxiliary pistons (42–45) configured to move said primary piston (36) alternatingly in two travel directions;
    wherein said primary piston (36) has a piston body (37) having first and second piston body end faces facing away from one another;
    wherein said primary piston (36) comprises first and second piston rods (38, 39), wherein said first piston rod (38) is connected to said first piston body end face and said second piston rod (39) is connected to said second piston body end face, wherein said first and second piston rods (38, 39) project away form said first and second piston body end faces and extend in said travel directions;
    pressure chambers (65–70) configured to accommodate said auxiliary pistons (42–45) and said first and second piston rods (38, 39); and
    shift valves (46, 47) connected to said pressure chambers (65–70).

10. The control device according to claim 9, wherein said piston body (37) is block-shaped.

11. A control device for a semiautomatic gearshift mechanism of a vehicle, said control device comprising:
    a first actuator configured to move a gearshift shaft for gutter selection in a first shaft movement direction;
    a second actuator configured to move the gearshift shaft for gear selection in a second shaft movement direction;
    wherein said first actuator comprises a primary piston (36) and at least two auxiliary pistons (42–45) configured to move said primary piston (36) alternatingly in two travel directions;

wherein said primary piston (36) has a piston body (37) having first and second piston body end faces facing away from one another;

wherein said primary piston (36) comprises first and second piston rods (38, 39), wherein said first piston rod (38) is connected to said first piston body end face and said second piston rod (39) is connected to said second piston body end face, wherein said first and second piston rods (38, 39) project away form said first and second piston body end faces and extend in said travel directions; and wherein said second actuator has a positioner (2) and wherein said primary piston (36) is configured to e moveable relative to said positioner (2).

12. The control device according to claim 11, further comprising an intermediate member (35) connected to said primary piston (36) for movement in said two travel directions.

13. The control device according to claim 12, wherein said intermediate member (35) is configured to be pivotable relative to said primary piston (36) to a limited extent.

14. The control device according to claim 12, wherein said intermediate member (35) is fixedly seated on the gearshift shaft (15) for common rotation with the gearshift shaft (15).

15. The control device according to claim 12, wherein said intermediate member (35) is a single arm lever.

16. The control device according to claim 12, wherein said intermediate member (35) is configured to be moveable in said first shaft movement direction relative to said positioner (2).

17. The control device according to claim 12, wherein said intermediate member (35) and said positioner (2) are positive-lockingly connected to one another in a direction of rotation of the gearshift shaft (15).

18. The control device according to claim 12, wherein said primary piston (36) has at least one solenoid (48) interacting with a sensor (49) for measuring a travel stroke of said primary piston (36).

19. The control device according to claim 12, wherein said second actuator has two piston units (4, 5) configured to act on opposite sides of said positioner (2) for moving said positioner (2).

20. The control device according to claim 12, wherein said positioner (2) is U-shaped and has two legs (12, 13) and a connecting stay (14) connecting said two legs (12, 13).

21. The control device according to claim 20, wherein one of said legs (13) of said positioner (2) is seated rotatably on the gearshift shaft (15).

22. The control device according to claim 21, wherein said connecting stay (14) has a guide (33) configured to receive and guide said intermediate member (35) and extending in said first shaft movement direction of the gearshift shaft (15).

23. The control device according to claim 21, wherein said positioner (2) has at least one solenoid (19) interacting with a sensor (20) for measuring a pivot stroke of said positioner (2).

24. The control device according to claim 19, wherein each of said two piston units (4, 5) has two pistons (21, 23).

25. The control device according to claim 24, wherein said two pistons (21, 23) of each one of said two piston units (4, 5) are an inner sleeve and an outer sleeve, wherein said outer sleeve is seated on said inner sleeve.

26. The control device according to claim 25, wherein said inner sleeve (23) engages said positioner (2).

27. The control device according to claim 19, further comprising switching valves (8, 9), wherein said piston units (4, 5) are configured to be actuated by a pressure medium via said switching valves (8, 9).

28. The control device according to claim 19, wherein said piston units (4, 5) and said auxiliary pistons (42–45) are positioned at a right angle to one another.

29. The control device according to claim 11, wherein said piston body (37) is block-shaped.

30. A control device for a semiautomatic gearshift mechanism of a vehicle, said control device comprising:

a first actuator configured to move a gearshift shaft for gutter selection in a first shaft movement direction;

a second actuator configured to move the gearshift shaft for gear selection in a second shaft movement direction;

wherein said first actuator comprises a primary piston (36) and at least two auxiliary pistons (42–45) configured to move said primary piston (36) alternatingly in two travel directions;

wherein said primary piston (36) has a piston body (37) having first and second piston body end faces facing away from one another;

wherein said primary piston (36) comprises first and second piston rods (38, 39), wherein said first piston rod (38) is connected to said first piston body end face and said second piston rod (39) is connected to said second piston body end face, wherein said first and second piston rods (38, 39) project away form said first and second piston body end faces and extend in said travel directions;

a housing (1) configured to accommodate said first and second actuators: and a detachable auxiliary unit (89) comprising a tank (52) holding a pressure medium, wherein said auxiliary unit (89) is detachable connected to said housing (1).

31. The control device according to claim 30, wherein said housing (1) has line connectors (90, 91) and wherein said auxiliary unit (89) has counter connectors (93, 94) configured to be received in said line connectors (90, 91).

32. The control device according to claim 31, wherein said counter connectors (93, 94) comprise a closure element (95, 96), respectively.

33. The control device according to claim 32, wherein said closure element is a check valve (95, 96).

34. The control device according to claim 32, wherein said closure element (95, 96) is configured to automatically reach a release position when said auxiliary unit (89) is connected to said housing.

35. The control device according to claim 30, wherein said piston body (37) is block-shaped.

36. A control device for a semiautomatic gearshift mechanism of a vehicle, said control device comprising:

a first actuator configured to move a gearshift shaft for gutter selection in a first shaft movement direction;

a second actuator configured to move the gearshift shaft for gear selection in a second shaft movement direction;

wherein said first actuator comprises a primary piston (36) and at least two auxiliary pistons (42–45) configured to move said primary piston (36) alternatingly in two travel directions;

wherein said primary piston (36) has a piston body (37) having first and second piston body end faces facing away from one another;

wherein said primary piston (36) comprises first and second piston rods (38, 39), wherein said first piston rod (38) is connected to said first piston body end face and said second piston rod (39) is connected to said second piston body end face, wherein said first and second piston rods (38, 39) project away form said first and second piston body end faces and extend in said travel directions;

a tank (52) holding a pressure medium and having communication paths from said tank (52) to said first and second actuators;

an actuating element (104) for a clutch (102); and a clutch control valve (101) arranged in at least one of said communication paths and configured to actuate said actuating element (104).

37. The control device according to claim 36, further comprising at least one pressure spring (113) acting on said actuating element (104).

38. The control device according to claim 3, wherein said actuating element (104) is configured to be pressed by said at least one pressure spring (113) against a pressure plate of the clutch (102).

39. The control device according to claim 38, wherein a first force exerted by the pressure plate of the clutch (102) onto said actuating element (104) is greater than a second force exerted by said pressure spring (113) onto said actuating element (104) in a direction opposite a direction of said first force.

40. The control device according to claim 38, wherein said actuating element (104) is comprised of an inner part and an outer part (108, 116) inserted into one another, wherein said inner part (116) is pivotable to a limited extent relative to said outer part (108).

41. The control device according to claim 38, comprising a pressure chamber (129) connected to said tank (52) and delimited by said actuating element (104) on a side where said at least one pressure spring (113) is located, wherein said pressure chamber (129) has a pressure line (131) coupled to said clutch control valve (101).

42. The control device according to claim 41, wherein said actuating element (104) is configured to be moveable counter to a force exerted by the pressure plate of the clutch (102) by loading with the pressure medium.

43. The control device according to claim 36, wherein said piston body (37) is block-shaped.

\* \* \* \* \*